(12) United States Patent
Iwashita et al.

(10) Patent No.: US 8,522,648 B2
(45) Date of Patent: Sep. 3, 2013

(54) SHEATH REMOVING UNIT AND OPTICAL FIBER-SHEATH REMOVING

(75) Inventors: Yoshinori Iwashita, Sakura (JP); Noriyuki Kawanishi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/222,767

(22) Filed: Aug. 31, 2011

(65) Prior Publication Data
US 2011/0308358 A1    Dec. 22, 2011

Related U.S. Application Data

(63) Continuation of application No. PCT/JP2010/001449, filed on Mar. 3, 2010.

(30) Foreign Application Priority Data

Mar. 3, 2009   (JP) .................................. 2009-049819

(51) Int. Cl.
*H02G 1/12*      (2006.01)
*B21F 13/00*    (2006.01)
*B26B 27/00*    (2006.01)
*B26B 29/00*    (2006.01)

(52) U.S. Cl.
USPC ................. 81/9.51; 81/9.4; 30/90.1; 30/90.6; 30/90.8; 30/286; 30/287

(58) Field of Classification Search
USPC .................................................. 81/9.4, 9.51
See application file for complete search history.

(56) References Cited

U.S. PATENT DOCUMENTS 4,117,749 A * 10/1978 Economu ....................... 30/90.6

7,103,253 B2   9/2006 Mizuno et al.
2011/0094343 A1 * 4/2011 Ji ..................................... 81/9.4

FOREIGN PATENT DOCUMENTS

| JP | 46-010997 Y1 | 4/1971 |
| JP | 61-041207 U | 3/1986 |
| JP | 02-024806 U | 2/1990 |
| JP | 04-347509 A | 12/1992 |
| JP | 05-029443 Y2 | 7/1993 |
| JP | 6-276637 A | 9/1994 |

(Continued)

OTHER PUBLICATIONS

Korean Office Action dated Jul. 30, 2012, issued in corresponding Korean Patent Application No. 10-2011-7019638.

*Primary Examiner* — Monica Carter
*Assistant Examiner* — Danny Hong
(74) *Attorney, Agent, or Firm* — Sughrue Mion, PLLC

(57) ABSTRACT

A sheath removing unit according to the invention includes a sheath removing blade that includes a pair of blade bodies disposed so as to face each other, and an optical fiber guide that includes first guide body and the second guide body. The first guide body includes a first protruding portion that is disposed so as to be superimposed on a first blade body of the blade bodies and protrudes from the first blade body toward a second blade body. The second guide body includes a second protruding portion that is disposed so as to be superimposed on the second blade body and protrudes from the second blade body toward the first blade body. The first protruding portion includes a lower inclined portion, which is inclined outward toward a protruding direction of the first protruding portion, on the surface thereof facing the second guide body. The second protruding portion includes an upper inclined portion, which is inclined outward toward a protruding direction of the second protruding portion, on the surface thereof facing the first guide body.

12 Claims, 8 Drawing Sheets

(56) References Cited

FOREIGN PATENT DOCUMENTS

| JP | 09-113732 A | 5/1997 |
| JP | 2001-320811 A | 11/2001 |
| JP | 2004-077909 A | 3/2004 |
| WO | 02/04998 A1 | 1/2002 |

* cited by examiner

SHEATH REMOVING UNIT AND OPTICAL FIBER-SHEATH REMOVING

CROSS REFERENCE TO RELATED APPLICATIONS

This application is a continuation application based on a PCT Patent Application No. PCT/JP2010/001449, filed Mar. 3, 2010, whose priority is claimed on Japanese Patent Application No. 2009-049819, filed Mar. 3, 2009, the entire content of which are hereby incorporated by reference.

BACKGROUND OF THE INVENTION

1. Field of the Invention

The present invention relates to a sheath removing unit and an optical fiber-sheath removing device that remove a sheath of a sheathed optical fiber, such as an optical fiber strand and an optical fiber core.

2. Description of the Related Art

When an optical fiber is to be connected to a device, a connector, or the like, a sheath in the vicinity of the tip of the optical fiber needs to be removed so that a bare optical fiber is exposed to the outside (see Japanese Unexamined Patent Application, First Publication No. H09-113732 and Pamphlet of International Publication No. 2002-4998).

An example of a sheath removing unit in the related art is shown in FIGS. 10 to 12 as a tool that removes the sheath.

The sheath removing unit 20 is a unit that removes a sheath 21b of a sheathed optical fiber 21, and includes a sheath removing blade 28.

The sheath removing blade 28 includes a blade pressing plate 22, a semicircular blade 23, a flat blade 24, and a blade receiving plate 25. The blade pressing plate, the semicircular blade, the flat blade, and the blade receiving plate are laminated in this order and integrated.

A notch 22a in which the sheathed optical fiber 21 can be received is formed at the blade pressing plate 22.

The semicircular blade 23 includes a semicircular blade portion 23a.

The inner diameter of the blade portion 23a is smaller than the outer diameter of the sheath 21b of the sheathed optical fiber 21 and larger than the outer diameter of a bare optical fiber 21a of the sheathed optical fiber 21.

As shown in FIG. 12, the blade receiving plate 25 includes a pressing portion 27 and a base portion 26 including a V-shaped notch 26a in which the sheathed optical fiber 21 is received.

While the sheathed optical fiber 21 is received in the notches 22a and 26a as shown in FIG. 11, the sheath removing unit 20 is made to move in the direction of an arrow in FIG. 11.

Accordingly, the blade portion 23a of the semicircular blade 23 removes the sheath 21b of the sheathed optical fiber 21.

At present, optical fiber-sheath removing devices including the above-mentioned sheath removing unit are generally manual optical fiber-sheath removing devices.

Although this method is convenient, the success rate of the removal of a sheath may vary according to the worker. For this reason, there was room for improvement in working efficiency of the method.

Accordingly, the automation of the device has been examined for the purpose of the solution of this problem.

The shape of a V-shaped groove, which leads an optical fiber to a sheath removing blade, has caused a problem at the time of this examination (see Patent Literatures 1 and 2).

That is, even when a linear optical fiber is led to the V-shaped groove in a sheath removing device including the V-shaped groove, positional deviation occurs between the optical fiber and the sheath removing blade. For this reason, it was difficult to set an optical fiber at an appropriate position on the sheath removing blade.

Furthermore, the size of the latest optical fiber amplifiers has been significantly reduced.

For this reason, an optical fiber received in the optical fiber amplifier may have a small radius of curvature and a tendency to bend in many cases.

Additionally, since an optical fiber is stored while being wound on a bobbin, a tendency to bend may occur in the same manner.

When a sheathed optical fiber 21 having this tendency to bend is treated in the sheath removing unit 20, the sheathed optical fiber 21 might not be positioned at the notches 22a and 26a and a positional deviation might occur.

As a result, there is a concern that breakage will occur at a bare optical fiber 21a due to the semicircular blade 23 and the like when the sheath 21b is to be removed.

Accordingly, an object of the invention is to provide a sheath removing unit that is suitable for specifications of an automatic device or the like and includes a guide capable of accurately positioning an optical fiber, and an optical fiber-sheath removing device including the sheath removing unit.

In particular, an object of the invention is to provide a sheath removing unit and an optical fiber-sheath removing device that can prevent breakage of a bare optical fiber without positional deviation of an optical fiber at the time of the removal of a sheath even when being applied to a sheathed optical fiber having a tendency to bend.

SUMMARY

The following devise was employed in order to achieve the above-mentioned object through the solution of the problems.

(1) A sheath removing unit according to the invention includes a sheath removing blade and an optical fiber guide. The sheath removing blade includes a pair of blade bodies disposed so as to face each other, and concave blade portions are formed on each opposite surfaces of the blade bodies.

The optical fiber guide is disposed so as to be superimposed on the sheath removing blade. The sheath removing unit removes a sheath of a sheathed optical fiber.

The optical fiber guide includes a first guide body and a second guide body that are disposed so as to face each other.

The first guide body includes a first protruding portion that is disposed so as to be superimposed on a first blade body of the blade bodies and protrudes from the opposite surface of the first blade body toward a second blade body when seen in plan view.

The second guide body includes a second protruding portion that is disposed so as to be superimposed on the second blade body and protrudes from the opposite surface of the second blade body toward the first blade body when seen in plan view.

A lower inclined portion, which is inclined outward toward a protruding direction of the first protruding portion, is formed on a surface of the first protruding portion facing the second guide body.

An upper inclined portion, which is inclined outward toward a protruding direction of the second protruding portion, is formed on a surface of the second protruding portion facing the first guide body.

(2) In the case of (1), an inclination angle (θ1) of the lower inclined portion with respect to the protruding direction of the first protruding portion and an inclination angle (θ2) of the upper inclined portion with respect to the protruding direction of the second protruding portion may be in the range of 15 to 45°.

(3) In the case of (1), the sheath removing unit may further include a positioning plate that positions the sheathed optical fiber and is disposed on the side opposite to the side of the optical fiber guide where the sheath removing blade is positioned. The positioning plate may include a pair of positioning portions disposed so as to face each other. A First positioning portion of the positioning portions may be disposed so as to operate integrally with the first guide body. A second positioning portion may be disposed so as to operate integrally with the second guide body. Receiving portions, which receive the sheathed optical fiber in a radial direction of the sheathed optical fiber, may be formed on opposite surfaces of the first positioning portion and the second positioning portion at positions corresponding to the concave blade portions of the sheath removing blade, respectively.

(4) In the case of (3), a gas inlet, which is opened to a space between the first guide body and the second guide body, may be formed at the positioning plate.

(5) In the case of (3), a liquid inlet, which is opened to a space between the first guide body and the second guide body, may be formed at the positioning plate.

(6) In the case of (3), a liquid inlet, which is opened to a space between the first guide body and the second guide body, may be formed at the first positioning portion and a gas inlet, which is opened to the space, may be formed at the second positioning portion.

(7) In the case of (1), positioning mechanisms may be provided at the pair of blade bodies, respectively.

(8) In the case of (3), positioning mechanisms may be provided at the pair of positioning portions, respectively.

(9) An optical fiber-sheath removing device according to the invention includes the sheath removing unit described in (1).

In the sheath removing unit described in (1), the lower inclined portion is formed at the first protruding portion of the first guide body of the optical fiber guide and the upper inclined portion is formed at the second protruding portion of the second guide body.

For this reason, it is possible to reliably lead the sheathed optical fiber to the concave blade portions of the sheath removing blade by the upper or lower inclined portion by making these first guide body and second guide body approach each other even though the sheathed optical fiber has a tendency to bend.

Accordingly, it is possible to remove a sheath while the optical fiber is held at an appropriate position.

For this reason, it is possible to suppress the deterioration of the breaking strength of the optical fiber that is caused by the breakage occurring at the bare optical fiber when the sheath is removed.

Thus, according to the sheath removing unit described in (1), it is possible to provide a bare optical fiber that can be used for a long time.

Additionally, the structure described in (1) is easily applied to optical fiber-sheath removing devices having different specifications.

That is, if the sheath removing unit described in (1) is mounted instead of a sheath removing blade that is used in an existing optical fiber-sheath removing device, the same advantage as the advantage of this application is obtained.

DETAILED DESCRIPTION OF THE PREFERRED EMBODIMENTS

First Embodiment

Figure 1:
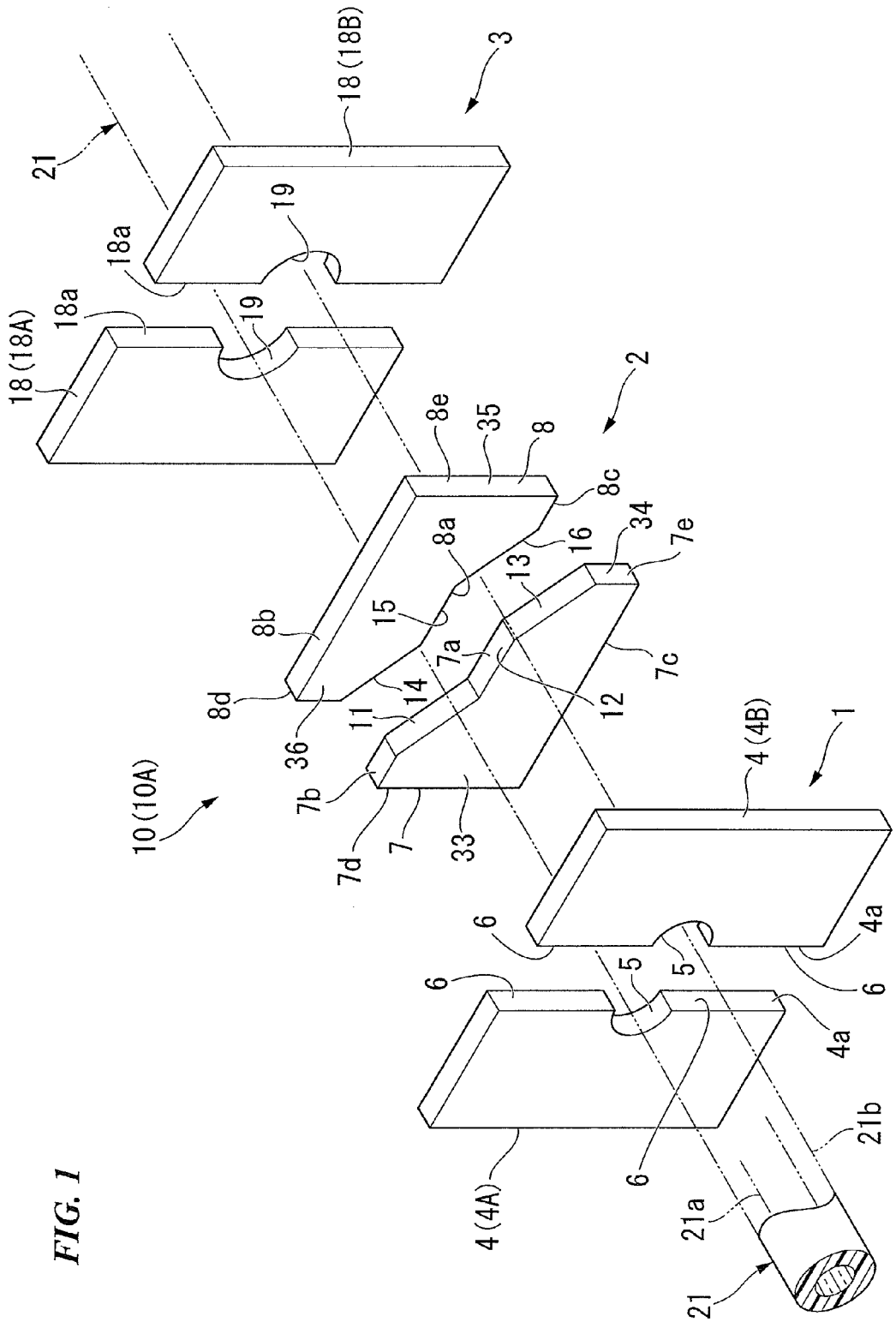
FIG. 1 is an exploded perspective view of a sheath removing unit according to a first embodiment of the invention.

FIG. 1 is an exploded perspective view of a sheath removing unit 10 (10A) according to a first embodiment of the invention.

Figure 2:
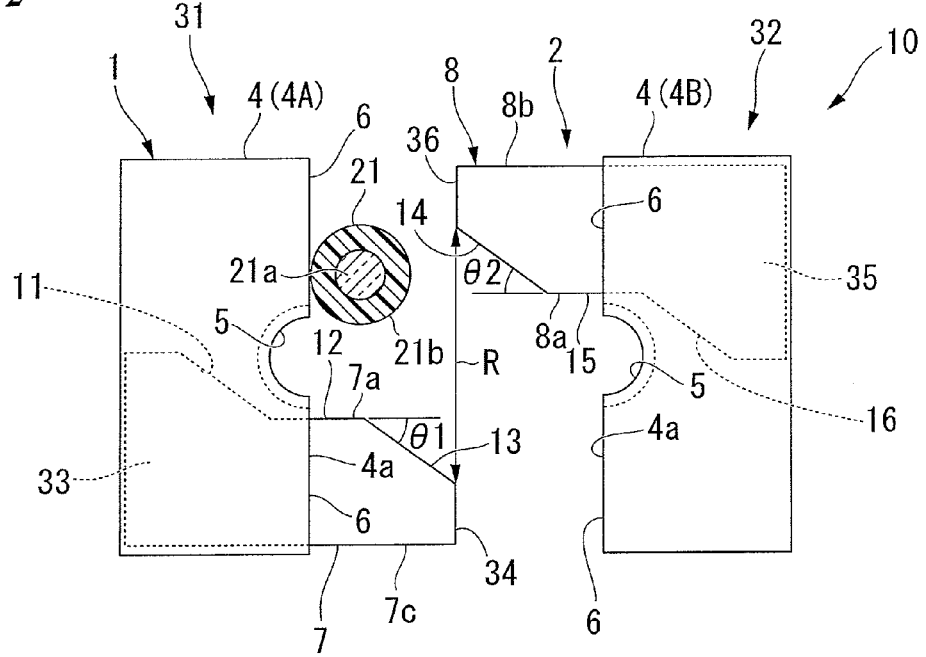
FIG. 2 is a front view of the sheath removing unit according to the first embodiment.

FIG. 2 is a front view of the sheath removing unit 10A according to the first embodiment.

Figure 3:
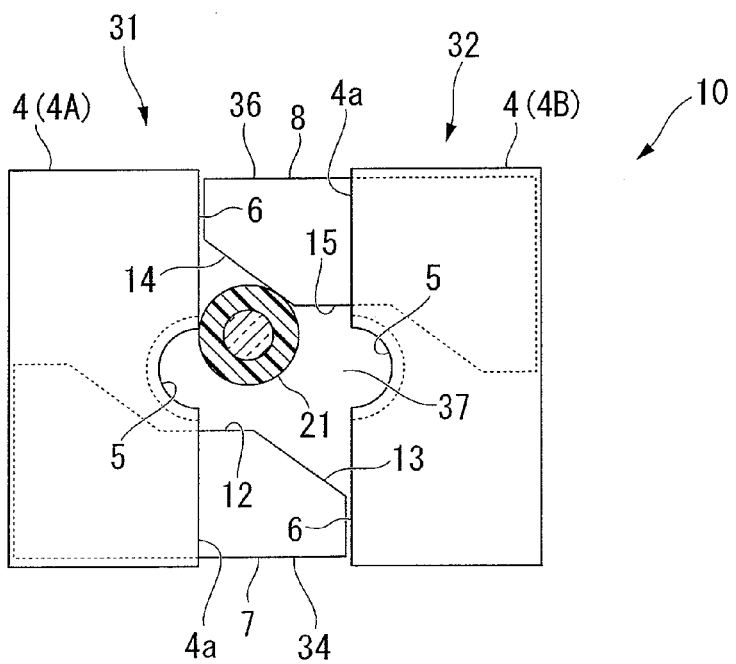
FIG. 3 is a front view illustrating the operation of the sheath removing unit according to the first embodiment.

FIG. 3 is a front view illustrating the operation of the sheath removing unit 10A according to the first embodiment.

Figure 4:
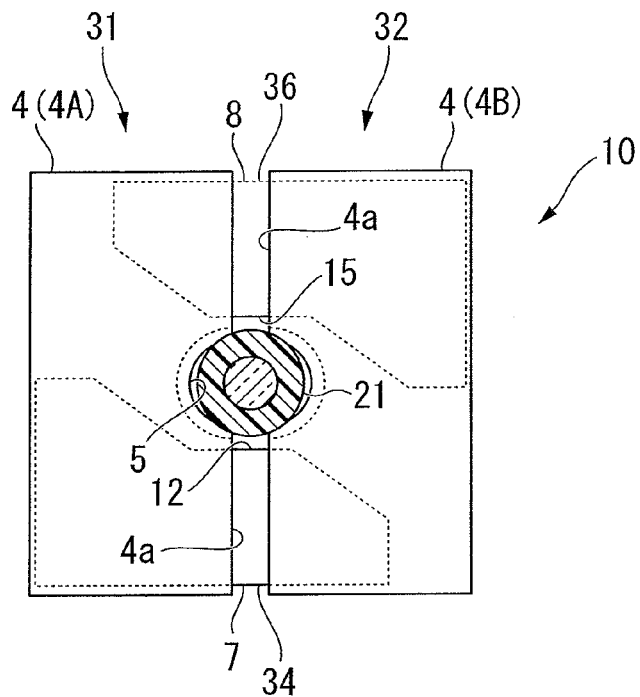
FIG. 4 is a front view illustrating the operation of the sheath removing unit according to the first embodiment.

FIG. 4 is a front view illustrating the operation of the sheath removing unit 10A according to the first embodiment.

The sheath removing unit 10A according to this embodiment removes a sheath 21b of a sheathed optical fiber 21 from a bare optical fiber 21a.

As shown in FIGS. 1 and 2, the sheath removing unit 10A according to this embodiment includes a sheath removing blade 1, an optical fiber guide 2, and a positioning plate 3.

The sheath removing blade 1, the optical fiber guide 2, and the positioning plate 3 are disposed in this order in a thickness direction thereof.

The sheath removing blade 1, the optical fiber guide 2, and the positioning plate 3 may be disposed so as to be separated from each other and may be disposed so as to be laminated on each other.

The sheathed optical fiber 21 is, for example, an optical fiber core or an optical fiber strand.

The sheath removing blade 1 includes a pair of substantially rectangular blade bodies 4 and 4 that is formed in the shape of a thin plate.

In the following description, a first blade body 4 is denoted by reference numeral 4A and a second blade body 4 is denoted by reference numeral 4B.

These blade bodies 4 (4A and 4B) are disposed in substantially the same plane so that opposite surfaces (opposite edge portions) 4a and 4a face each other.

A concave blade portion 5 having a semicircular shape is formed substantially in the middle of each of the opposite edge portions 4a and 4a.

The portions of the opposite edge portions 4a and 4a, which are positioned on both sides of these concave blade portions 5, form straight portions 6 that are formed in a linear shape.

When the respective blade bodies 4 (4A and 4B) come into contact with each other so that these opposite edge portions 4a and 4a face each other, the concave blade portions 5 and 5 form a circular opening (first opening) and the respective straight portions 6 and 6 come into contact with each other in the same plane.

The concave blade portions 5 and 5 are formed so that the diameter of the first opening is smaller than the outer diameter of the sheath 21b of the sheathed optical fiber 21 and is larger than the outer diameter of the bare optical fiber 21a.

Accordingly, the concave blade portions 5 and 5 remove only the sheath 21b without damaging the bare optical fiber 21a.

Figure 5:
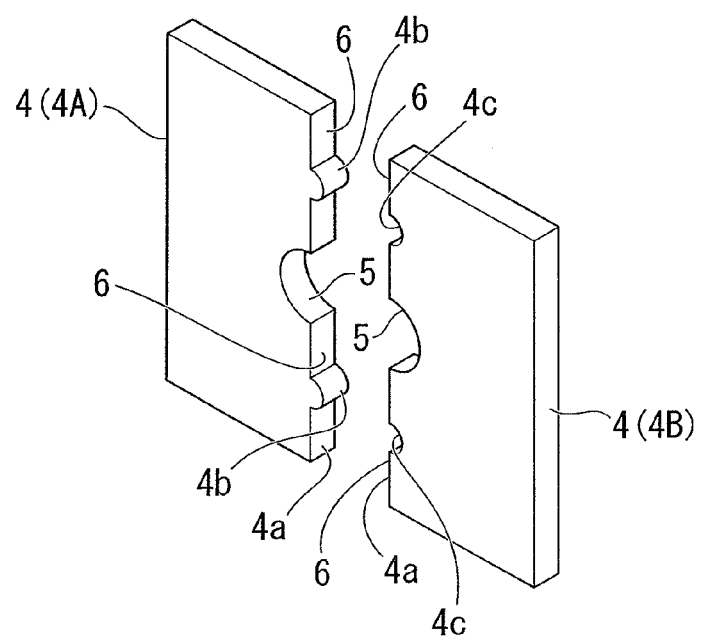
FIG. 5 is a perspective view of a modification of blade bodies of the first embodiment.

Positioning mechanisms 4b and 4c may be formed at the straight portions 6 of the blade bodies 4 (4A and 4B) as shown in FIG. 5.

When these blade bodies 4A and 4B come into contact with each other and remove the sheath 21b of the sheathed optical fiber 21, the positioning mechanisms 4b and 4c position the blade bodies 4A and 4B (the sheath removing unit 10A) in a height direction.

For example, as shown in FIG. 5, projecting portions 4b that are formed at a first blade body 4A and recessed portions 4c that are formed at a second blade body 4B so as to be fitted to the projecting portions 4b are used as the positioning mechanisms.

When the sheath 21b is removed, the projecting portions 4b and the recessed portions 4c are fitted to each other, so that the blade bodies 4 (4A and 4B) are positioned in the height direction.

Accordingly, a problem that the sheath 21b partially remains without being completely removed or breakage occurs at the bare optical fiber 21a due to the deviation of the positions of the blade bodies 4 (4A and 4B) is suppressed at the time of the removal of the sheath 21b.

Thus, a bare optical fiber 21a from which a sheath 21b has been removed is more stably provided.

FIG. 5 has shown a case where the projecting portions 4b are formed at a first blade body 4A and the recessed portions 4c are formed at a second blade body 4B. However, for example, the projecting portion 4b may be formed at the upper portion of a first blade body 4A and the recessed portion 4c may be formed at the lower portion of the blade body 4A.

Furthermore, the number of the projecting portions 4b and the recessed portions 4c is not particularly limited.

The sheathed optical fiber 21, which is used in the invention, is not particularly limited.

For example, the sheathed optical fiber is a single mode fiber (based on ITU-T G652 B), and Fujikura FutureGuide (R)-SM and the like may be used as the sheathed optical fiber.

The optical fiber guide 2 includes a pair of guide bodies 7 and 8 (a first guide body 7 and a second guide body 8) formed in the shape of a thin plate.

The pair of guide bodies 7 and 8 is disposed adjacent to the sheath removing blade 1 in the longitudinal direction of the sheathed optical fiber 21.

In this case, the sheath removing blade 1 is disposed parallel to the pair of guide bodies 7 and 8.

The first guide body 7 and the second guide body 8 are disposed in the same plane so as to face each other.

In this specification, the opposite surfaces of the first guide body 7 and the second guide body 8 facing each other are referred to as opposite edge portions 7a and 8a (inner edges).

The opposite edge portion 8a of the second guide body has a shape corresponding to the shape of the opposite edge portion 7a of the first guide body 7.

As shown in FIG. 1, upper and lower edge portions 7b and 7c of the first guide body 7 are formed parallel to each other.

The opposite edge portion 7a of the first guide body 7 includes an upper inclined portion 11 that descends from the upper edge portion 7b at a predetermined angle from a first end 7d of the first guide body 7 toward a second end 7e thereof, a middle portion 12 that extends from the lower end of the upper inclined portion 11 so as to be parallel to the upper edge portion 7b, and a lower inclined portion 13 that descends from the middle portion 12 at a predetermined angle.

As shown in FIG. 2, an inclination angle $\theta1$ of the lower inclined portion 13 with respect to the lower edge portion 7c is preferably in the range of 15 to 45° and more preferably in the range of 20 to 35°.

If the inclination angle $\theta1$ is smaller than 15°, a range R where the sheathed optical fiber 21 can be led to an appropriate position (into the concave blade portions 5) becomes narrow.

On the other hand, if the inclination angle $\theta1$ is larger than 45°, it is difficult to smoothly move the sheathed optical fiber 21 to an appropriate position.

It is preferable that the lower inclined portion 13 of the first guide body 7 be formed at a position corresponding to the lower straight portion 6 of the sheath removing blade 1 as shown in FIG. 2.

It is preferable that the position of the middle portion 12 of the first guide body 7 be a position corresponding to the vicinity of the lower end of the concave blade portion 5 of a first blade body 4A.

That is, it is preferable that the position of the middle portion 12 of the first guide body 7 be a position corresponding to the lower end of the concave blade portion 5 or a position slightly below this position.

Due to this structure, the sheathed optical fiber 21 is guided by the lower inclined portion 13 of the first guide body 7 so as to be introduced to the concave blade portion 5 of the sheath removing blade 1.

As shown in FIGS. 1 and 2, a portion of the first guide body 7, which includes the middle portion 12 and the lower inclined portion 13, forms a first protruding portion 34 that protrudes from the lower portion of a main body portion 33 (a portion including the upper inclined portion 11) to the right side in FIG. 2.

That is, the first protruding portion 34 protrudes along the middle portion 12 toward a second blade body 4B.

For this reason, the lower inclined portion 13 is inclined so as to gradually descend toward the protruding direction of the first protruding portion 34 (that is, toward the outside).

As shown in FIG. 1, upper and lower edge portions 8b and 8c of the second guide body 8 are formed parallel to each other.

The opposite edge portion 8a of the second guide body 8 includes an upper inclined portion 14 that descends at a predetermined angle from a first end 8d toward a second end 8e, a middle portion 15 that extends from the lower end of the upper inclined portion 14 so as to be parallel to the upper edge portion 8b, and a lower inclined portion 16 that descends from the middle portion 15 at a predetermined angle.

As described above, the opposite edge portion 8a of the second guide body 8 has a shape corresponding to the shape of the opposite edge portion 7a of the first guide body 7.

That is, the upper inclined portion 14 of the second guide body 8 is formed substantially parallel to the upper inclined portion 11 of the first guide body 7.

The middle portion 15 of the second guide body 8 is formed substantially parallel to the middle portion 12 of the first guide body 7.

The lower inclined portion 16 of the second guide body 8 is formed substantially parallel to the lower inclined portion 13 of the first guide body 7.

Accordingly, the upper inclined portion 14, the middle portion 15, and the lower inclined portion 16 of the second guide body 8 are formed so as to face the upper inclined portion 11, the middle portion 12, and the lower inclined portion 13 of the first guide body 7, respectively, when the opposite edge portion 7a of the first guide body 7 and the opposite edge portion 8a of the second guide body 8 face each other.

As shown in FIG. 2, an inclination angle θ2 of the upper inclined portion 14 of the second guide body 8 with respect to the upper edge portion 8b is preferably in the range of 15 to 45° and more preferably in the range of 20 to 35°, for the same reason as the inclination angle θ1 of the lower inclined portion 13 of the first guide body 7.

It is preferable that the upper inclined portion 14 of the second guide body 8 be formed at a position corresponding to the upper straight portion 6 of the sheath removing blade 1 as shown in FIG. 2.

It is preferable that the position of the middle portion 15 of the second guide body 8 be a position corresponding to the vicinity of the upper end of the concave blade portion 5 of a second blade body 4B.

That is, it is preferable that the position of the middle portion 15 of the second guide body 8 be a position corresponding to the upper end of the concave blade portion 5 or a position slightly above this position.

Due to this structure, the sheathed optical fiber 21 is guided by the upper inclined portion 14 of the second guide body 8 so as to be introduced to the concave blade portion 5 of the sheath removing blade 1.

It is preferable that the difference between the height of the middle portion 12 of the first guide body 7 and the height of the middle portion 15 of the second guide body 8 be substantially equal to the outer diameter of the sheathed optical fiber 21 or be slightly larger than the outer diameter of the sheathed optical fiber 21.

Accordingly, it is possible to lead the sheathed optical fiber 21 to the concave blade portion 5 while the vertical movement of the sheathed optical fiber 21 is regulated between the middle portions 12 and 15 as described below.

As shown in FIGS. 1 and 2, a portion of the second guide body 8, which includes the middle portion 15 and the upper inclined portion 14, forms a second protruding portion 36 that protrudes from the upper portion of a main body portion 35 (a portion including the lower inclined portion 16) to the left side in FIG. 2.

That is, the second protruding portion 36 protrudes along the middle portion 15 toward a first blade body 4A.

For this reason, the upper inclined portion 14 is inclined so as to gradually ascend toward the protruding direction of the second protruding portion 36 (that is, toward the outside).

The positioning plate 3 leads the sheathed optical fiber 21 into a space between the first guide body 7 and the second guide body 8 of the optical fiber guide 2, particularly, the range R shown in FIG. 2, and positions the sheathed optical fiber 21.

This positioning plate 3 includes a pair of positioning portions 18 (a first positioning portion 18A and a second positioning portion 18B) as shown in FIG. 1, and these positioning portions are disposed so as to face each other.

In this specification, the opposite surfaces of these positioning portions 18 (18A and 18B) facing each other are referred to as opposite edge portions 18a.

These positioning portions 18 (18A and 18B) are provided parallel to the optical fiber guide 2 in the longitudinal direction of the sheathed optical fiber 21.

Concave receiving portions 19 and 19, which have a semi-circular shape and receive and position the sheathed optical fiber 21, are formed substantially in the middle of the opposite edge portions 18a and 18a of these positioning portions 18 (18A and 18B), respectively.

When the positioning portions 18 (18A and 18B) come into contact with each other so as to face each other, the concave receiving portions 19 and 19 form a circular opening (second opening).

The concave receiving portions 19 and 19 are formed so that the diameter of the second opening is slightly larger than the outer diameter of the sheathed optical fiber 21.

That is, the concave receiving portions 19 and 19 have a size where the sheathed optical fiber 21 is received without inconvenience.

When the sheath removing blade 1, the optical fiber guide 2, and the positioning plate 3 are disposed so as to be superimposed, the concave receiving portions 19 and 19 are formed at the positions corresponding to the concave blade portions 5 of the sheath removing blade 1.

Figure 6:
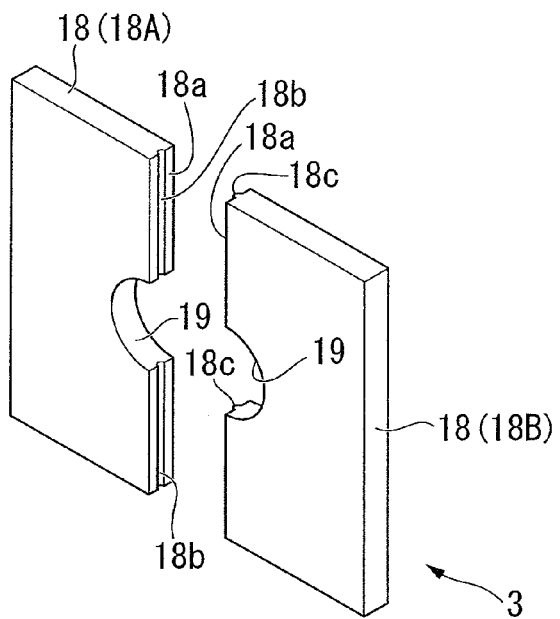
FIG. 6 is a perspective view of a modification of an optical fiber guide of the first embodiment.

Positioning mechanisms 18b and 18c may be formed at the opposite edge portions 18a and 18a of the positioning portions 18 (18A and 18B) as shown in FIG. 6.

When the sheath 21b is removed, the positioning mechanisms 18b and 18c position the positioning plate 3 (the sheath removing unit 10A) in the thickness direction of the positioning plate.

For example, as shown in FIG. 6, recessed portions 18b that are formed at a first positioning portion 18A and protruding portions 18c that are formed at a second positioning portion 18B so as to be fitted to the recessed portions 18b are used as the positioning mechanisms.

When the opposite edge portions 18a of a first positioning portion 18A and a second positioning portion 18B come into contact with each other at the time of the removal of the sheath 21b, the recessed portion 18b and the protruding portion 18c are fitted to each other and the positioning plate 3 is positioned in the thickness direction thereof.

Accordingly, the concave blade portion 5 of a first blade body 4A and the concave blade portion 5 of a second blade body 4B come into contact with the sheath 21b of the sheathed optical fiber 21 without deviating from each other in the thickness direction of the blade body, so that the sheath 21b is uniformly removed.

Even though the sheath removing unit 10A according to this embodiment has a basic structure that includes the sheath removing blade 1 and the optical fiber guide 2 (that is, a structure that does not include the positioning plate 3), it is possible to guide the sheathed optical fiber 21, which has a tendency to bend, to the concave blade portions 5 that are formed at the center of the sheath removing blade 1 and to remove the sheath 21b.

It is possible to more reliably guide the sheathed optical fiber 21 to the concave blade portions 5 that are formed at the center of the sheath removing blade 1 by adding the positioning plate 3 to this structure.

As a result, it is possible to prevent the sheathed optical fiber 21 from being damaged at the time of the removal of the sheath 21b and to secure the strength of the optical fiber from which the sheath has been removed.

A first blade body 4A, the first guide body 7, and a first positioning portion 18A of the sheath removing unit 10A according to this embodiment integrally operate as a first unit body 31.

Additionally, a second blade body 4B, the second guide body 8, and a second positioning portion 18B integrally operate as a second unit body 32.

One or both of the first unit body 31 and the second unit body 32 can be moved by, for example, a moving mechanism (not shown) so as to approach each other or so as to be separated from each other.

When seen in plan view, the first protruding portion 34 of the first guide body 7 of the first unit body 31 protrudes from the opposite edge portion 4a of a first blade body 4A toward the second unit body 32 as shown in FIG. 2.

When seen in plan view, the second protruding portion 36 of the second guide body 8 of the second unit body 32 protrudes from the opposite edge portion 4a of a second blade body 4B toward the first unit body 31.

Next, the use of the sheath removing unit 10A according to this embodiment will be described.

As shown in FIG. 2, the first unit body 31 and the second unit body 32 are made to be separated from each other and a sheathed optical fiber 21 is disposed between the first unit body and the second unit body.

In the example shown in FIG. 2, the height of the sheathed optical fiber 21 corresponds to a position corresponding to the upper inclined portion 14 of the second guide body 8.

When the first unit body 31 and the second unit body 32 are made to approach each other as shown in FIG. 3, the sheathed optical fiber 21 comes into contact with the upper inclined portion 14 of the second guide body 8.

When these first unit body 31 and second unit body 32 are made to further approach each other, the sheathed optical fiber 21 is pressed by the upper inclined portion 14 of the second unit body 32 and is moved downward along the straight portion 6 of the blade body 4 of the first unit body 31.

When seen in plan view in the state shown in FIG. 3, the sheathed optical fiber 21 is positioned in a space 37 that is surrounded by the first protruding portion 34, a first blade body 4A, a second blade body 4B, and the second protruding portion 36.

Both the first unit body 31 and the second unit body 32 may be moved so as to approach each other, and one of the first unit body and the second unit body may be moved so as to approach the other thereof.

In the example shown in FIG. 3, the moving direction of the first or second unit body is substantially the same as the protruding direction of the first protruding portion 34 or the second protruding portion 36.

When the first unit body 31 and the second unit body 32 are made to further approach each other as shown in FIG. 4, the sheathed optical fiber 21 is pressed by the upper inclined portion 14 of the second unit body 32 and is further moved downward.

In this case, the vertical movement of the sheathed optical fiber 21 is regulated between the middle portion 12 of the first unit body 31 (first guide body 7) and the middle portion 15 of the second unit body 32 (second guide body 8).

When the first unit body 31 and the second unit body 32 are made to further approach each other in this state so that the opposite edge portions 4a and 4a of these blade bodies 4A and 4B approach each other, the sheathed optical fiber 21 is caught by the concave blade portion 5 of the first blade body 4A and the concave blade portion 5 of the second blade body 4B.

Additionally, as shown in FIG. 1, the sheathed optical fiber 21 is led into the concave receiving portions 19 and 19 of the positioning plate 3 by the movement of the first unit body 31 and the second unit body 32 and is positioned in the concave receiving portions.

In this state, the sheathed optical fiber 21 is moved relative to the sheath removing unit 10 in the thickness direction of the sheath removing blade 1, that is, in the direction perpendicular to the plane of FIGS. 2 to 4.

Due to this operation, a force is applied to the sheath 21b in the longitudinal direction of the sheathed optical fiber 21 by the concave blade portions 5 and 5. Accordingly, the sheath 21b is removed from the bare optical fiber 21a.

If the sheathed optical fiber 21 is disposed at a low position in the space 37, for example, at the height corresponding to the lower inclined portion 13 of the first guide body 7, the sheathed optical fiber 21 is moved upward by the lower inclined portion 13 and led into the concave blade portion 5.

As described above, in the sheath removing unit 10A according to this embodiment, the sheathed optical fiber 21 is led into the concave blade portion 5 and the concave receiving portion 19 by the upper inclined portion 14 of the second guide body 8 or the lower inclined portion 13 of the first guide body 7 in the space 37 that is surrounded by the first protruding portion 34, the first blade body 4A, the second blade body 4B, and the second protruding portion 36 shown in FIG. 3.

Accordingly, even if a sheathed optical fiber 21 has a tendency to bend, the sheathed optical fiber 21 is led into the concave blade portion 5 and the concave receiving portion 19 by the first guide body 7 or the second guide body 8. As a result, the sheath 21b of the sheathed optical fiber is removed at an exact position.

In addition, the sheath removing unit 10A according to this embodiment is easily applied to optical fiber-sheath removing devices having different specifications.

That is, if the sheath removing unit 10A according to this embodiment is mounted instead of a sheath removing blade that is used in an existing optical fiber-sheath removing device, the above-mentioned advantage is obtained.

Second Embodiment

Figure 7:
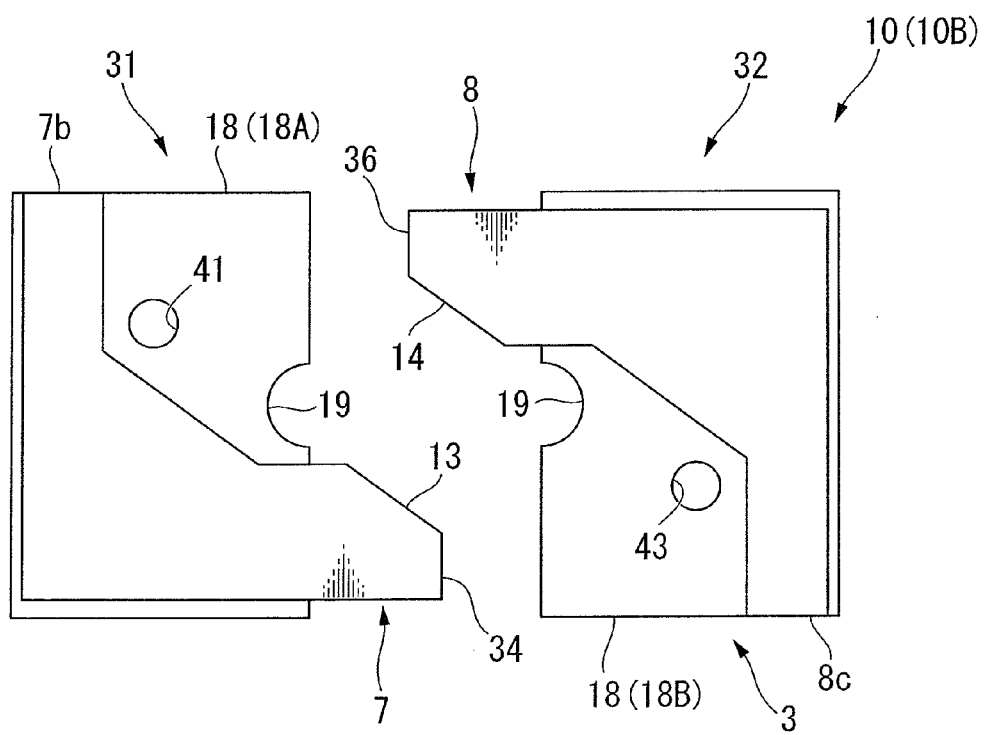
FIG. 7 is a front view of a sheath removing unit according to a second embodiment of the invention.

FIG. 7 is a front view of a sheath removing unit 10 (10B) according to a second embodiment of the invention.

The same components as the components of the sheath removing unit 10A according to the first embodiment are denoted by the same reference numerals in the following description and the description thereof will be omitted.

A sheath removing unit 10B according to this embodiment is different from the sheath removing unit 10A according to the first embodiment in that a liquid inlet 41 is formed at a first positioning plate 18A and a gas inlet 43 is formed at a second positioning plate 18B.

Additionally, the sheath removing unit according to this embodiment is different from the sheath removing unit according to the first embodiment in that an upper edge portion 7b of a first guide body 7 is formed at the position corresponding to the vicinity of the upper end of a first positioning portion 18A and a lower edge portion 8c of a second guide body 8 is formed at the position corresponding to the vicinity of the lower end of a second positioning portion 18B.

Both the liquid inlet 41 and the gas inlet 43 have been formed in this embodiment, but only one of the liquid inlet and the gas inlet may be formed at the positioning portions 18 (18A and 18B).

Figure 8:
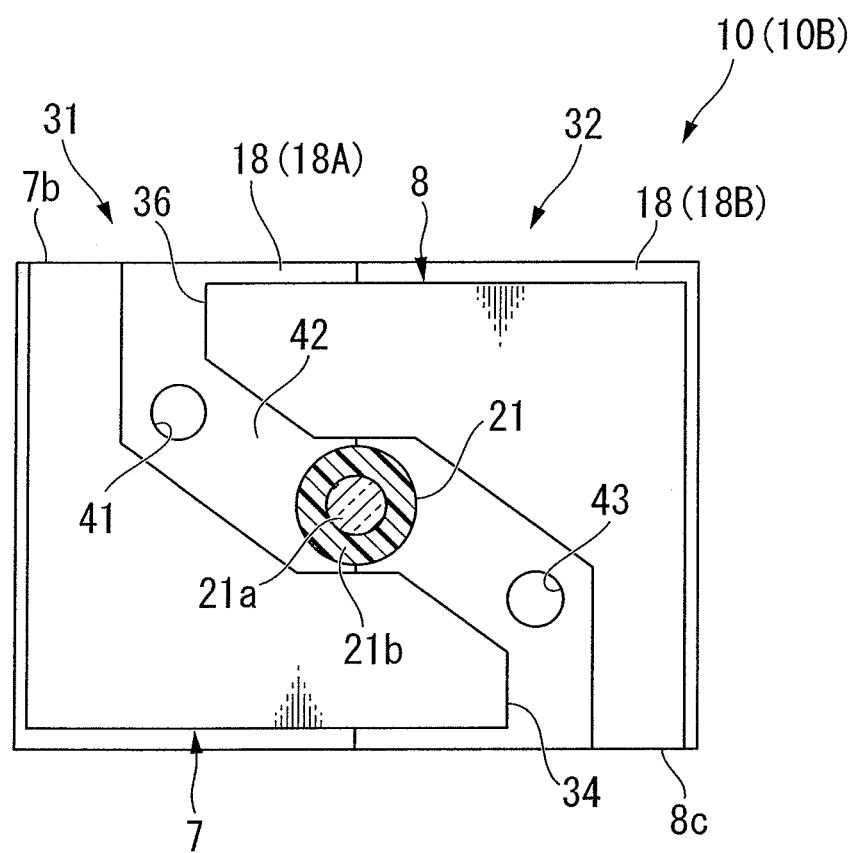
FIG. 8 is a front view illustrating the operation of the sheath removing unit according to the second embodiment.

A sheath removing blade 1 is not shown in FIGS. 7 and 8, but the structure of the sheath removing blade 1 is the same as that of the sheath removing blade of the first embodiment.

The gas inlet 43 is formed at a second positioning plate 18B so as to be opened to a space 42 between the first guide body 7 and the second guide body 8 as shown in FIG. 8 when the first unit body 31 and the second unit body 32 are combined with each other.

Gas such as air is introduced to the space 42 from the gas inlet 43.

FIG. 8 is a view showing a state where the sheathed optical fiber 21 is positioned.

In this state, a sheath 21b is removed by the sheath removing blade 1 (not shown in FIGS. 7 and 8).

Accordingly, a scrap, which is the removed sheath 21b, is generated in the space 42 between the first guide body 7 and the second guide body 8.

Here, when the gas is introduced to the space 42 from the gas inlet 43, the flow of gas is generated from the gas inlet 43 to the outside of the space 42.

As a result, the scrap is discharged from the space 42 together with the flow of gas.

While the sheath 21b is removed, gas may be frequently introduced. Alternatively, after a predetermined amount of the sheath 21b is removed, gas may be introduced.

The liquid inlet 41 is formed at a first positioning plate 18A so as to be opened to the space 42 as shown in FIG. 8.

Liquid is introduced to the space 42 from the liquid inlet 41.

For example, alcohol such as ethanol, water, or the like is used as this liquid.

When the liquid is introduced to the space 42 from the liquid inlet 41, the flow of liquid is generated from the liquid inlet 41 to the outside of the space 42.

As a result, the scrap is discharged from the space 42 together with the flow of liquid.

If not only gas but also liquid is introduced to the space 42, it is possible to more effectively discharge the scrap from the space 42.

Liquid, which is introduced to the space 42, is also supplied to the concave blade portions 5.

For this reason, when alcohol is used as this liquid, the sheath 21b is removed by the concave blade portions 5 while friction between the concave blade portion 5 and the sheath 21b is reduced by alcohol.

At this time, the concave blade portions 5 are also cleaned at the same time using alcohol.

Accordingly, the sheath 21b is more effectively removed and nicks in the concave blade portion 5 caused by friction or the scrap are suppressed, so that the concave blade portion 5 can be used for a long time.

It is preferable that liquid inlet 41 be formed at a position above the concave blade portion 5 (concave receiving portion 19).

Accordingly, the liquid, which has been introduced to the space 42, is more actively supplied to a portion, which removes the sheath 21b, by the gravity applied to the liquid.

For this reason, as compared to the case where the liquid inlet 41 is formed at a position below the concave receiving portions 19, it is possible to stably supply liquid to a portion that removes the sheath 21b and to more effectively perform the removal of the scrap from the space 42, the cleaning of the concave blade portions 5, and the reduction of the friction between the sheath 21b and the concave blade portions 5.

Liquid may be introduced after a predetermined amount of the sheath 21b is removed. However, considering the above-mentioned action of liquid to the concave blade portions 5, it is preferable that liquid be frequently introduced while the sheath 21b is removed.

As described above, in the sheath removing unit 10B according to this embodiment, the scrap is discharged from the space 42 by the gas that is introduced to the space 42 from the gas inlet 43 or the liquid that is introduced to the space 42 from the liquid inlet 41.

Accordingly, it is possible to suppress the breakage of the bare optical fiber that is caused by the interference between the sheath removing blade 1 and residues of the scrap during the removal of the sheath, and to reduce the amount of the scrap on the bare optical fiber from which the sheath has been removed.

In the sheath removing unit 10B according to this embodiment, the upper edge portion 7b of the first guide body 7 is formed at the position corresponding to the upper end portion of a first positioning portion 18A (and a first blade body 4A).

Additionally, the lower edge portion 8c of the second guide body 8 is formed at the position corresponding to the lower end portion of a second positioning portion 18B (and a second blade body 4B).

Accordingly, the flow passage of liquid or gas, which has been introduced to the space 42, is formed to the outside of the space 42.

That is, in the sheath removing unit 10B according to this embodiment, the first guide body 7 and the second guide body 8 form not only the guide of the sheathed optical fiber 21 but also the flow passage of gas and liquid that are introduced to the space 42.

As a result, gas or liquid, which is introduced to the space 42, is efficiently introduced to a portion, which efficiently removes the sheath 21b, without being unnecessarily dispersed.

In addition, since the above-mentioned advantage is obtained without the increase of the number of parts, the reduction of the size of a device including the sheath removing unit 10B according to this embodiment is facilitated.

Even in this embodiment, like in the first embodiment, positioning mechanisms 4b and 4c may be formed at the sheath removing blade 1 (blade bodies 4) and positioning mechanisms 18b and 18c may be formed at the positioning plate 3 (positioning portions 18).

The same advantage as the advantage of the first embodiment is obtained.

<Optical Fiber-Sheath Removing Device>

Figure 9:
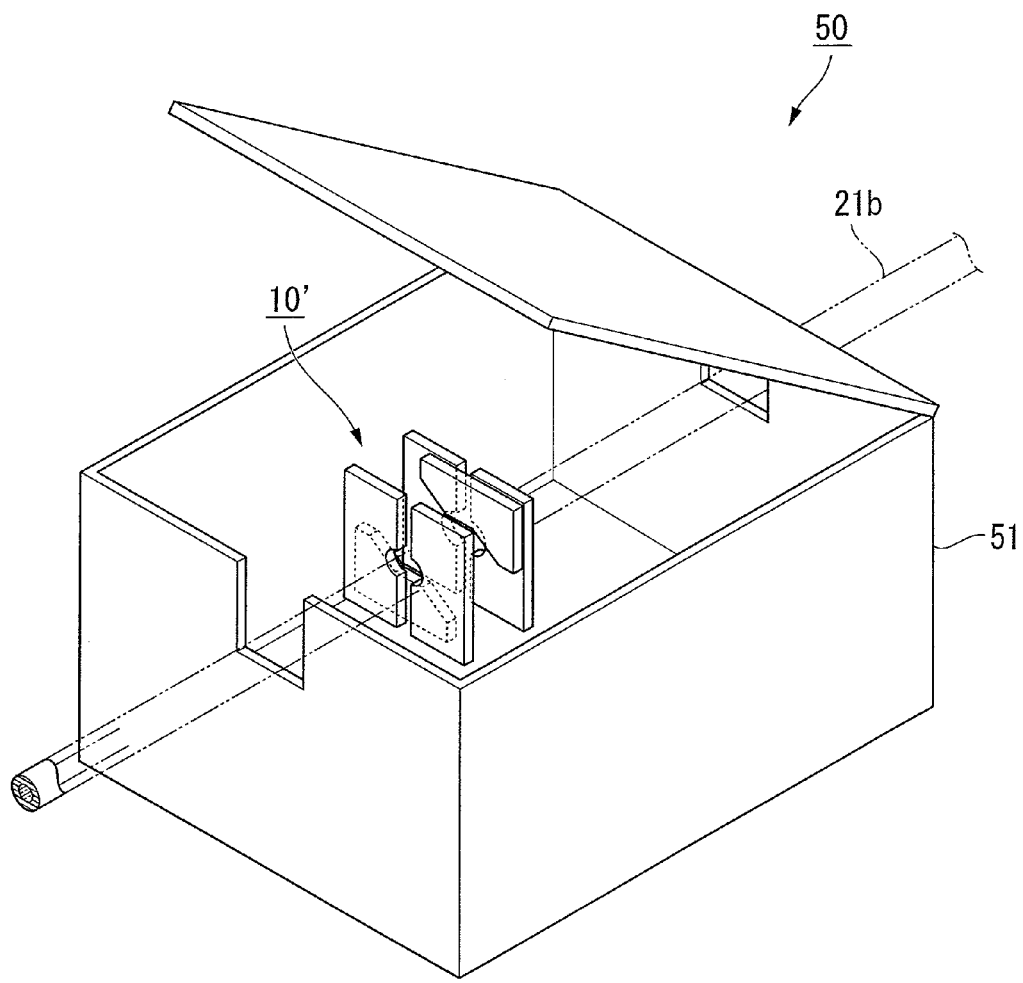
FIG. 9 is a perspective view schematically showing an optical fiber-sheath removing device of the invention.
Figure 10:
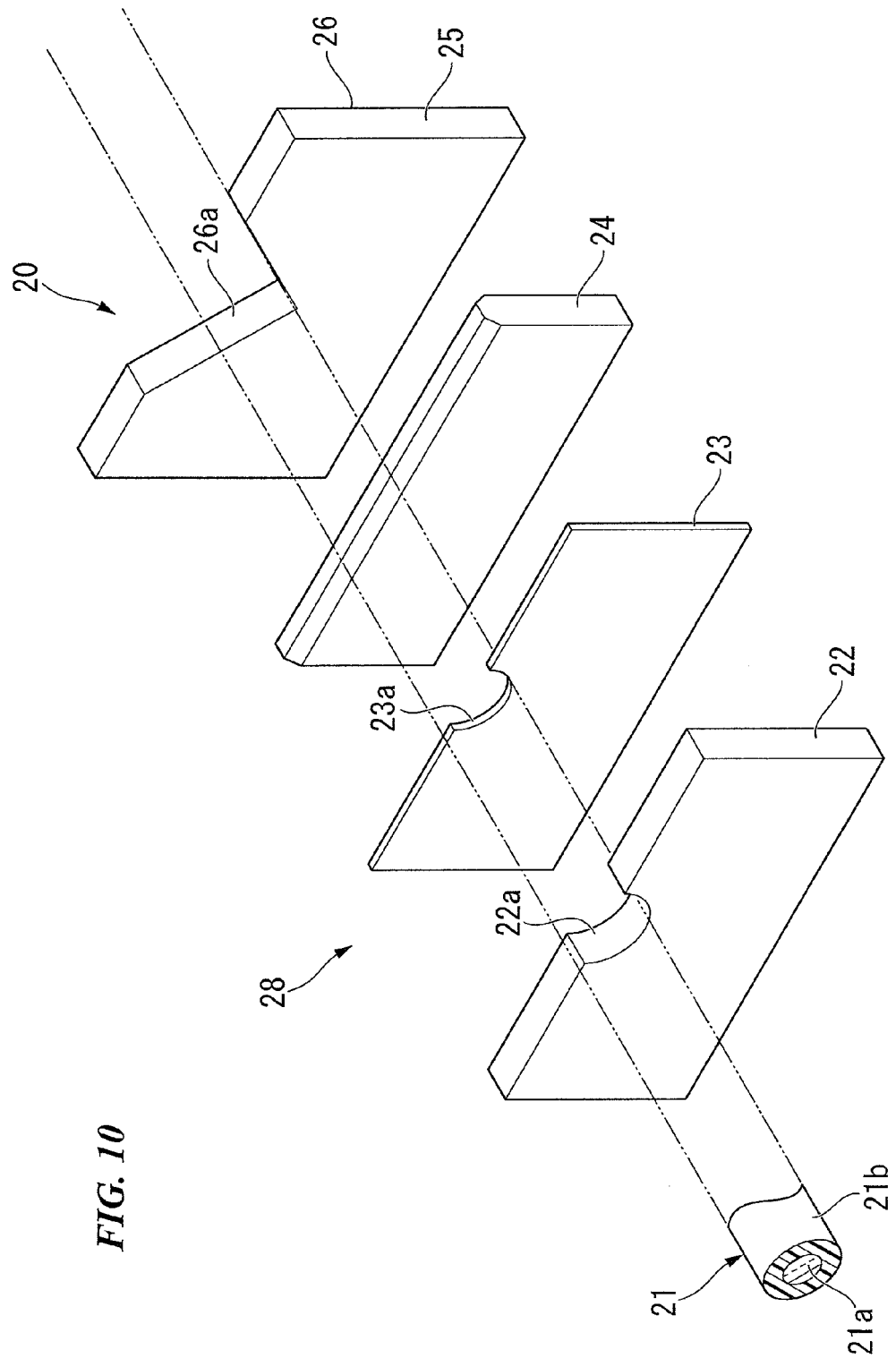
FIG. 10 is an exploded perspective view of an example of a sheath removing unit in the related art.
Figure 11:
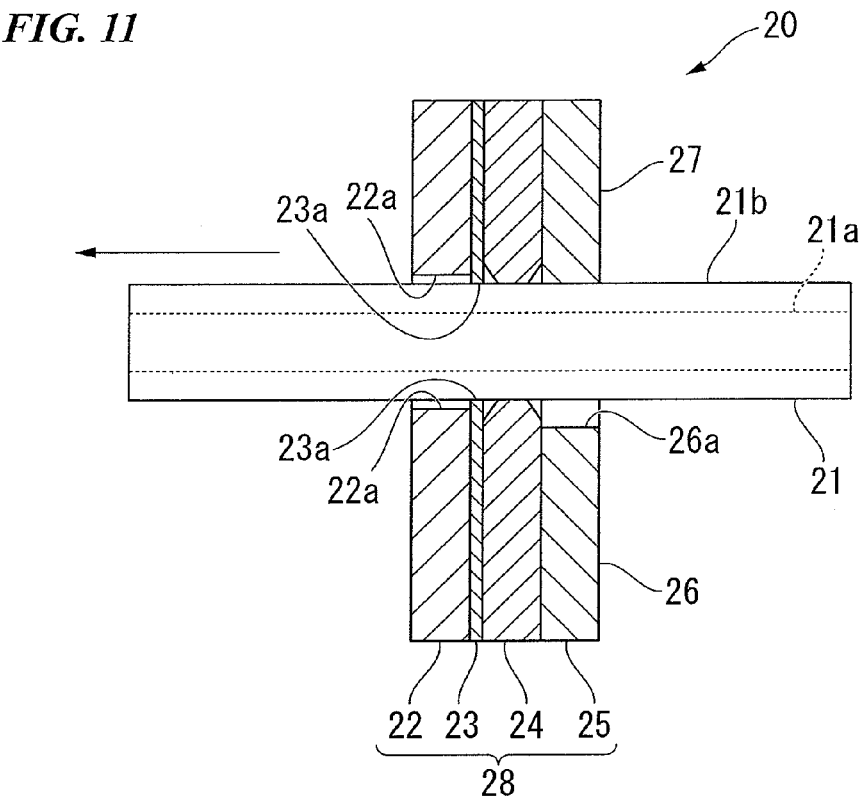
FIG. 11 is a cross-sectional view of the sheath removing unit in the related art.
Figure 12:
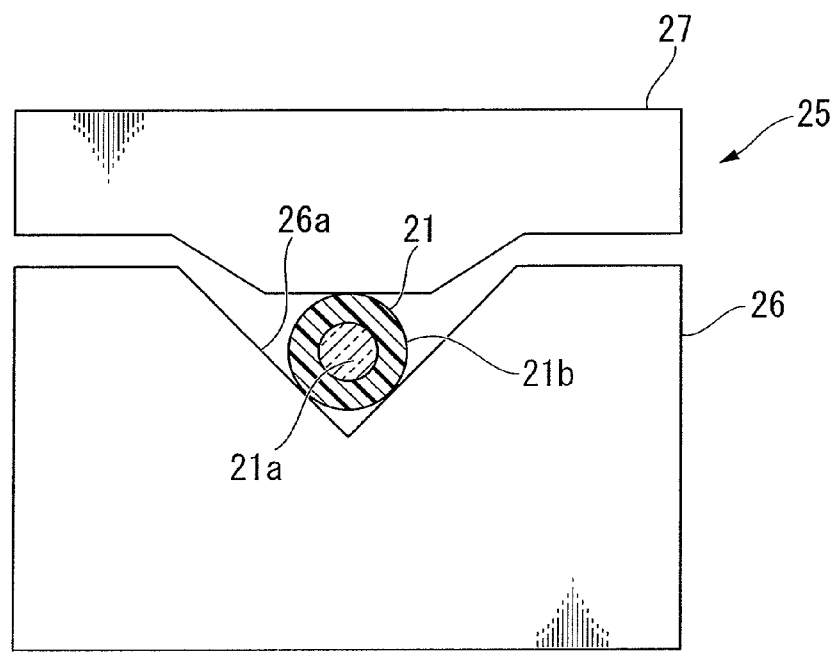
FIG. 12 is a front view of a blade receiving plate that is used in the sheath removing unit in the related art.

FIG. 9 is a view schematically showing an optical fiber-sheath removing device 50 according to an embodiment of the invention.

The optical fiber-sheath removing device 50 is an automatic device that includes the above-mentioned sheath removing unit 10 (10A or 10B), a drive mechanism (not shown), and a housing 51. The drive mechanism (not shown) drives the first unit body 31 and the second unit body 32 of the sheath removing unit 10 or one of the first unit body and the second unit body. The housing 51 receives the sheath removing unit and the drive mechanism therein.

A drive mechanism is adapted to make, for example, the blade bodies 4 (4A and 4B) of the sheath removing blade 1, the first guide body 7 and the second guide body 8 of the optical fiber guide 2, and the positioning portions 18 (18A and 18B) of the positioning plate 3 operate so as to be automatically opened and closed (operate so as to be moved in a horizontal direction), or is adapted to make the first unit 31 and the second unit operate so as to be automatically moved in a horizontal direction.

In the optical fiber-sheath removing device 50 according to this embodiment, when the sheathed optical fiber 21 is introduced into the optical fiber-sheath removing device 50, the first unit body 31 and the second unit body 32 are moved so as to approach each other by the drive mechanism or one of the first unit body and the second unit body is moved so as to approach the other by the drive mechanism. Accordingly, the sheathed optical fiber 21 is guided to and held at an appropriate position.

When the first unit body 31 and the second unit body 32 are moved so as to approach each other or one of the first unit body and the second unit body is moved so as to approach the other thereof, the sheath 21b of the sheathed optical fiber 21 is cut and removed by the sheath removing blade 1.

In this case, liquid is introduced to the space 42 from the liquid inlet 41 and gas is introduced to the space 42 from the gas inlet 43 in the optical fiber-sheath removing device 50 on which the sheath removing unit 10B according to the second embodiment is mounted.

Accordingly, it is possible to discharge the scrap, which is generated during an operation for removing the sheath, from a portion that removes the sheath 21b.

Therefore, it is possible to suppress the breakage of the bare optical fiber that is caused by the interference between the sheath removing blade 1 and residues of the scrap during the removal of the sheath, and to reduce the amount of the scrap on the bare optical fiber from which the sheath has been removed.

Additionally, since the optical fiber-sheath removing device 50 may be an automatic device, it is possible to provide a stable bare optical fiber without the accuracy deviation in removing the sheath that is caused by the skill of a worker.

Furthermore, since breakage does not easily occur at the obtained bare optical fiber, the deterioration of the breaking strength of the obtained bare optical fiber is suppressed.

For this reason, it is possible to provide a bare optical fiber that is suitable for a long-term use.

According to the sheath removing unit of the invention, even though a sheathed optical fiber has a tendency to bend, it is possible to reliably lead the sheathed optical fiber into the concave blade portions of the sheath removing blade.

Accordingly, it is possible to remove a sheath while the optical fiber is held at an exact position, and to suppress the deterioration or the like of the breaking strength of the optical fiber that is caused by the breakage occurring at a bare optical fiber when the sheath is removed.

Furthermore, according to the optical fiber-sheath removing device of the invention, it is possible to provide a stable bare optical fiber without the deviation of accuracy in removing the sheath that is caused by the skill of a worker.

In addition, since breakage does not easily occur at the obtained bare optical fiber, the deterioration of the breaking strength of the obtained bare optical fiber is suppressed.

For this reason, it is possible to provide a bare optical fiber that is suitable for long time use.

What is claimed is:

1. A sheath removing unit that removes a sheath of a sheathed optical fiber comprising:
    a sheath removing blade including a pair of blade bodies which are disposed so as to face each other and concave blade portions which are formed on each opposite surfaces of the blade bodies; and
    an optical fiber guide disposed so as to be superimposed on the sheath removing blade, wherein
    the optical fiber guide includes a first guide body and a second guide body, that are disposed so as to face each other,
    the first guide body includes a first protruding portion which is disposed so as to be superimposed on a first blade body of the blade bodies and protrudes from the opposite surface of a first blade body toward a second blade body when seen in plan view,
    the second guide body includes a second protruding portion that is disposed so as to be superimposed on a second blade body and protrudes from the opposite surface of a second blade body toward a first blade body when seen in plan view,
    a first upper inclined portion and a first lower inclined portion, which are outwardly inclined toward a protruding direction of the first protruding portion, are formed on a surface of the first protruding portion facing the second guide body,
    a second upper inclined portion and a second lower inclined portion, which are outwardly inclined toward a protruding direction of the second protruding portion, are formed on a surface of the second protruding portion facing the first guide body, and
    the first upper inclined portion is formed parallel to the second upper inclined portion and the first lower inclined portion is formed parallel to the second lower inclined portion.

2. The sheath removing unit according to claim 1, wherein an inclination angle ($\theta 1$) of the lower inclined portion with respect to the protruding direction of the first protruding portion and an inclination angle ($\theta 2$) of the upper inclined portion with respect to the protruding direction of the second protruding portion are in the range of 15 to 45°.

3. The sheath removing unit according to claim 1, further comprising:
    a positioning plate that positions the sheathed optical fiber and that is disposed on the side opposite to the side of the optical fiber guide where the sheath removing blade is positioned, wherein
    the positioning plate includes a pair of positioning portions disposed so as to face each other,
    a first positioning portion of the positioning portions is disposed so as to operate integrally with the first guide body,
    a second positioning portion is disposed so as to operate integrally with the second guide body, and
    receiving portions, which receive the sheathed optical fiber in a radial direction of the sheathed optical fiber, are formed on opposite surfaces of the first positioning portion and the second positioning portion at positions corresponding to the concave blade portions of the sheath removing blade, respectively.

4. The sheath removing unit according to claim 3, wherein a gas inlet, which is opened to a space between the first guide body and the second guide body, is formed at the positioning plate.

5. The sheath removing unit according to claim 3, wherein a liquid inlet, which is opened to a space between the first guide body and the second guide body, is formed at the positioning plate.

6. The sheath removing unit according to claim 3, wherein a liquid inlet, which is opened to a space between the first guide body and the second guide body, is formed at the first positioning portion, and
a gas inlet, which is opened to the space, is formed at the second positioning portion.

7. The sheath removing unit according to claim 1, wherein positioning mechanisms are provided at the pair of blade bodies, respectively.

8. The sheath removing unit according to claim 3, wherein positioning mechanisms are provided at the pair of positioning portions, respectively.

9. An optical fiber-sheath removing device that includes the sheath removing unit according to claim 1.

10. The sheath removing unit according to claim 4, wherein the first guide body and the second guide body form a guide of the sheathed optical fiber and a flow passage of gas that is introduced from the gas inlet.

11. The sheath removing unit according to claim 5, wherein the first guide body and the second guide body form a guide of the sheathed optical fiber and a flow passage of liquid that is introduced from the liquid inlet.

12. The sheath removing unit according to claim 6, wherein the first guide body and the second guide body form a guide of the sheathed optical fiber and a flow passage of liquid that is introduced from the liquid inlet and gas that is introduced from the gas inlet.

\* \* \* \* \*